(12) United States Patent
Hoffmann et al.

(10) Patent No.: US 7,289,891 B2
(45) Date of Patent: Oct. 30, 2007

(54) METHOD FOR OPERATING A VEHICLE OF A MAGNETIC LEVITATION RAILWAY

(75) Inventors: Reinhard Hoffmann, Nuremberg (DE); Robert Schmid, Neunkirchen am Brand (DE)

(73) Assignee: Siemens Aktiengesellschaft, Munich (DE)

( * ) Notice: Subject to any disclaimer, the term of this patent is extended or adjusted under 35 U.S.C. 154(b) by 296 days.

(21) Appl. No.: 11/077,147

(22) Filed: Mar. 11, 2005

(65) Prior Publication Data

US 2005/0199154 A1 Sep. 15, 2005

(30) Foreign Application Priority Data

Mar. 12, 2004 (DE) .................. 10 2004 012 247

(51) Int. Cl.
*B60L 13/04* (2006.01)
(52) U.S. Cl. ........................................ 701/19
(58) Field of Classification Search .................. 701/19
See application file for complete search history.

(56) References Cited

U.S. PATENT DOCUMENTS 5,225,726 A * 7/1993 Tozoni ......................... 310/12
5,282,424 A * 2/1994 O'Neill ....................... 104/282

FOREIGN PATENT DOCUMENTS

DE 19653728 A1 6/1998

* cited by examiner

*Primary Examiner*—Thu V. Nguyen
(74) *Attorney, Agent, or Firm*—Harness, Dickey & Pierce

(57) ABSTRACT

A method is for operating a vehicle of a magnetic levitation railway on a route which is fitted with a stator with a stator winding. There is provision for the time profile of the strength of the current to be measured in each provided supply phase of the stator winding. In addition, in the region of the respective supply phase on the route, the time profile of the magnetic flux of the magnetic leakage field emanating from the vehicle is measured. The force acting on the vehicle is then determined from current strength values, assigned magnetic fluxes and a motor constant of the vehicle. The force which is determined is compared with a threshold value and when the force deviates greatly the energy supply to the stator winding is interrupted.

2 Claims, No Drawings

METHOD FOR OPERATING A VEHICLE OF A MAGNETIC LEVITATION RAILWAY

The present application hereby claims priority under 35 U.S.C. §119 on German patent application numbers DE 10 2004 012 247.4 filed Mar. 12, 2004, the entire contents of which is hereby incorporated herein by reference.

FIELD OF THE INVENTION

The invention generally relates to a method for operating a vehicle of a magnetic levitation railway on a route which is fitted with a stator with a stator winding.

BACKGROUND OF THE INVENTION

It has already been proposed to monitor the operation of a magnetic levitation railway automatically. To do this, in the past a measurement has been performed exclusively in the vehicle of the magnetic levitation railway. The velocity of the vehicle was usually measured and compared with a setpoint value. If an excessively high velocity was then detected, a message then had to be issued by radio to a fixed control and instrumentation unit which then interrupted the energy supply to the linear motor arranged in the route.

It has become apparent that the transmission of information from the traveling vehicle to the fixed control and instrumentation unit is susceptible to failure. Furthermore, the average time which passes between an excessively high velocity being detected and the energy supply being switched off is, at an average of 2.3 seconds, very high compared to the usually high velocity of a magnetic levitation railway.

For this reason in the past it has been necessary for a connecting route, which is required only in the event of a failure, to be installed beyond the stopping location at a terminus station.

SUMMARY OF THE INVENTION

An embodiment of the invention includes an object of specifying a method for operating a vehicle of a magnetic levitation railway in which an undesired high velocity of the vehicle is quickly and reliably detected so that the vehicle can be stopped within a short time.

An object may be achieved according to an embodiment of the invention in that the time profile of the strength of the current I is measured in each provided supply phase of the stator winding. Further, the time profile of the magnetic flux $\Phi$ of the magnetic leakage field emanating from the vehicle is measured on the route in the region of the respective supply phase. In addition, the force F acting on the vehicle is determined from current strength values I, assigned magnetic fluxes $\Phi$ and a motor constant of the vehicle. Still further, the force F which is determined is compared with a threshold value, and when the force F deviates greatly, the energy supply to the stator winding is interrupted.

This provides an advantage that all the measurements may be carried out at the route and consequently there is no need to transmit information by radio from the traveling vehicle to a fixed control and instrumentation unit.

Particularly in the region of sets of switches and at the end of the route it is necessary to monitor the velocity and correspondingly the force which acts on the vehicle and is correlated to the change in the velocity (acceleration).

DETAILED DESCRIPTION OF THE EXEMPLARY EMBODIMENTS

An unacceptably high force or an unacceptable direction of force is quickly detected in an evaluation unit. From the unit, a switch-off instruction for the energy supply of the linear motor is then fed to the fixed control and instrumentation equipment without the need for a radio link. This provides an advantage that the time between the detection of an excessively high velocity or force and the switching-off of the energy supply is on average only approximately 0.5 seconds. The four to five times faster reaction time contributes to avoiding accidents. In particular, a significantly shorter connecting route is sufficient at a terminus station than in the past while providing the same degree of safety, which provides a cost advantage. As a result of the fact there is no longer any need for radio links, the method is also less susceptible to failure.

Since the magnetic flux $\Phi$ is the surface integral over the magnetic induction or flux density B, the acting force can be calculated from $dF=I\times dl\times B$, where l is the length of the conductor on which the magnetic induction B acts.

The acting force F is therefore easily obtained from the measured variables which are the magnetic flux $\Phi$ and the strength of the current I if constant variables of the linear motor are included.

As a rule, the determination of the force F for each phase of the n-phase stator winding is carried out individually and a sum of the individual forces is then formed, if appropriate. n is here an integer which indicates how many supply phases the stator winding has.

Definitive reliable information about the travel operation of the magnetic levitation railway are advantageously obtained easily within a very short time.

For example, the travel velocity v and/or the acceleration of the vehicle are/is determined from the magnetic flux $\Phi$ and compared with a threshold value of the velocity or the acceleration. This provides the advantage that information about the velocity and/or about the acceleration of the vehicle is obtained immediately.

The velocity can be calculated by way of the acceleration, for example from the previously determined force by the known mass of the vehicle.

The method according to an embodiment of the invention provides, in particular, an advantage that an unacceptable velocity of the vehicle can be detected directly at the route without a radio link which is susceptible to failure at certain times. Furthermore, in the case of a fault it is advantageously possible to intervene approximately four to five times more quickly in the operation of the vehicle than with known methods. The probability of accidents is reduced. In particular, in order to avoid accidents, a significantly shorter connecting route than in the past is sufficient, which saves costs.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for operating a vehicle of a magnetic levitation railway on a route which is fitted with a stator with a stator winding, comprising:

recording in a time profile measurements of the strength of the current in each provided supply phase of the stator winding;

recording in a time profile measurements of the magnetic flux of the magnetic leakage field emanating from the vehicle on the route in the region of the respective supply phase;

determining the force acting on the vehicle from current strength values, the magnetic fluxes and a motor constant of the vehicle;

comparing the force which is determined with a threshold value; and interrupting, when the force deviates greatly from the threshold value, the energy supply to the stator winding.

2. The method as claimed in claim 1, wherein the travel velocity of the vehicle is determined from the magnetic flux and is compared with a threshold value of the velocity, and wherein when the velocity deviates greatly, the energy supply to the stator winding is interrupted.

* * * * *